United States Patent [19]

Berthold et al.

[11] Patent Number: 5,223,918
[45] Date of Patent: Jun. 29, 1993

[54] FIBER OPTIC COLOR BALANCE MONITOR

[75] Inventors: John W. Berthold, Salem; Larry A. Jeffers, Alliance, both of Ohio; Mehmet A. Erdentug, St. Albans, England

[73] Assignee: The Babcock & Wilcox Company, New Orleans, La.

[21] Appl. No.: 895,223

[22] Filed: Jun. 8, 1992

Related U.S. Application Data

[63] Continuation of Ser. No. 666,271, Mar. 7, 1991, abandoned.

[51] Int. Cl.$^5$ .............................................. G01N 21/25
[52] U.S. Cl. ...................................... 356/407; 356/419
[58] Field of Search ................................ 356/402–421; 250/226, 227.2, 227.28, 227.31, 227.32; 385/116, 120, 484

[56] References Cited

U.S. PATENT DOCUMENTS

| | | | |
|---|---|---|---|
| 3,885,878 | 5/1975 | Ishak | 356/405 |
| 3,970,394 | 7/1976 | Stanton | 356/195 |
| 4,003,660 | 1/1977 | Christie, Jr. et al. | 356/416 |
| 4,464,054 | 8/1984 | Karras et al. | 356/406 |

FOREIGN PATENT DOCUMENTS 0081702 6/1983 European Pat. Off. .
1306461 2/1973 United Kingdom .

OTHER PUBLICATIONS

"Fully Electronic Color Sensor Breaks 'Cost Barrier'", Fiber Optics Sensors and Systems, Oct., 1989.

Primary Examiner—F. L. Evans
Assistant Examiner—K. P. Hantis
Attorney, Agent, or Firm—Vytas R. Matas; Robert J. Edwards; Daniel S. Kalka

[57] ABSTRACT

A fiber optic apparatus and method for monitoring color balance of a product that can consist of a complex two dimensional color pattern. This system employs at least one illuminating optical fiber (18) and at least two pick-up optical fibers (16). Filters (36) associated with each of the pick-up fibers (16) separate the reflected light into different color components. Photodetectors (38) convert the light intensity from each fiber (16) into analog electrical signals which are routed to a microprocessor based signal processing module (10) for conversion to digital output and subsequent analysis for monitoring color balance. If there is a change in color balance, a visual and/or acoustic alarm (62) is automatically activated.

10 Claims, 9 Drawing Sheets

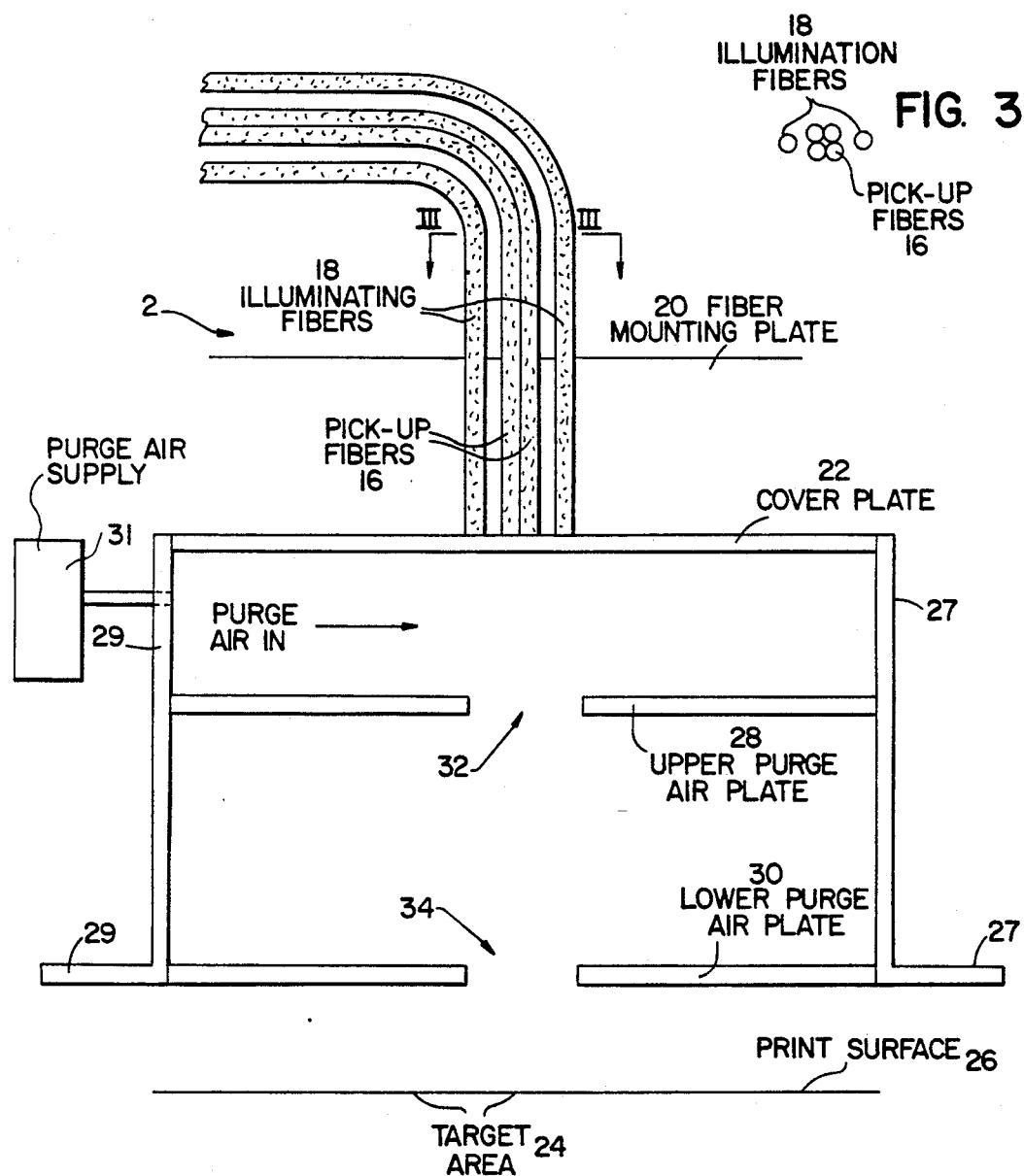

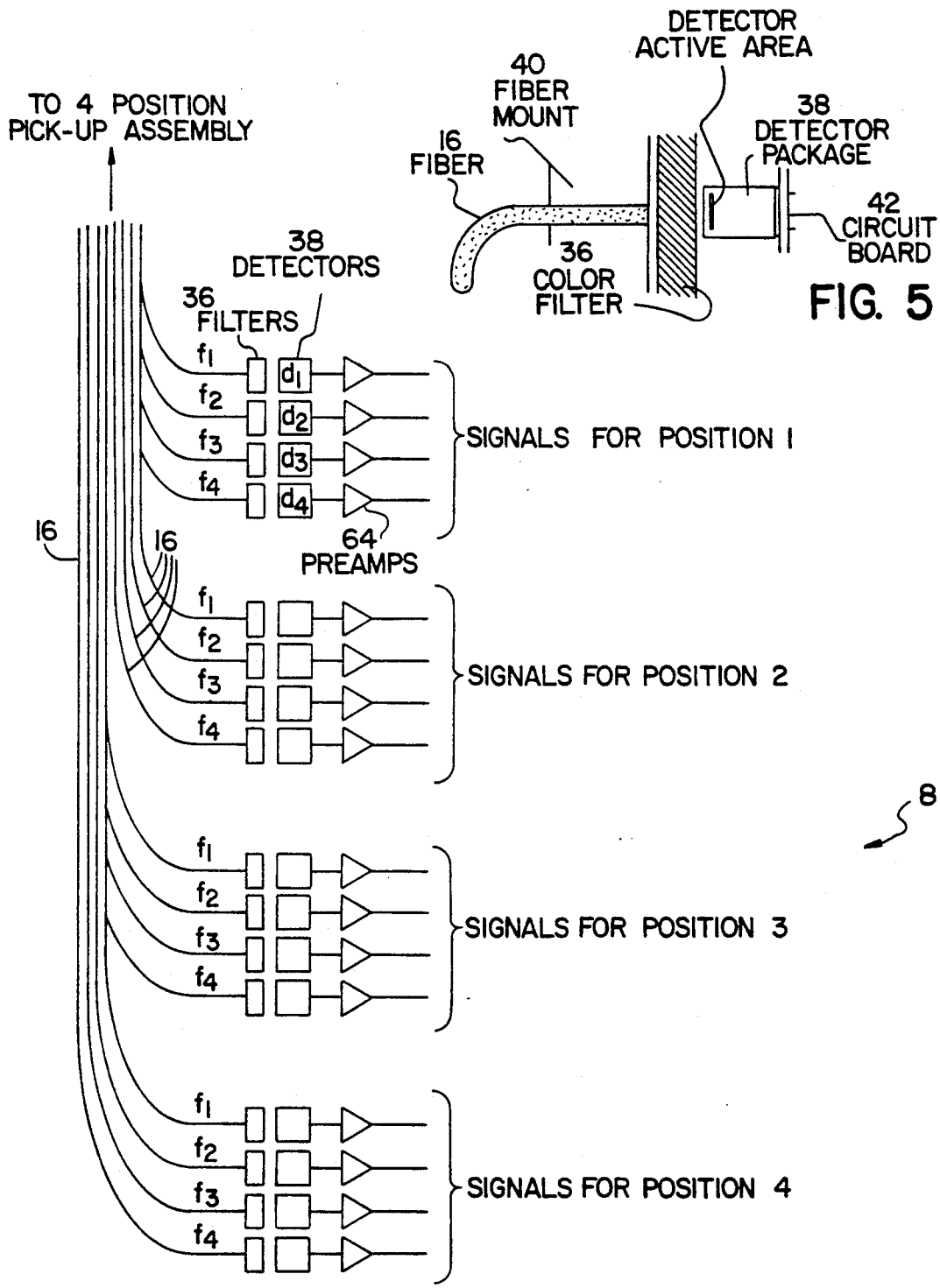

FIBER OPTIC COLOR BALANCE MONITOR

This is a continuation of application Ser. No. 07/666,271 filed Mar. 7, 1991 now abandoned.

BACKGROUND OF THE INVENTION

1. Field of the Invention

The present invention relates in general to a color balance monitor, and in particular to a new and useful fiber optic color balance monitor which is capable of measuring color-balance in printing operations.

2. Description of the Related Art

The operator of a color offset printing machine makes adjustments during set-up to provide the proper balance among the different inks required for realistic color rendition. After this initial "timing", the press produces copies at rates of up to twenty (20) copies per second. If the ink delivery changes for any component color during the press run, the resulting color rendition for the prints is degraded and significant amounts of materials and time may be wasted.

There are instruments such as colorimeters that are commercially available which are intended specifically for the measurement of color-balance. For example, U.S. Pat. Nos. 3,885,878; 3,999,860; 4,019,819; 4,150,898; 4,464,054; and 4,909,633 relate to various colorimeters some of which employ fiber optics.

There still exists a desire for a continuous method for monitoring the process during the run so that corrective action can be taken in a timely manner as the color balance deviates from acceptable limits. Several factors place the desired monitoring function beyond the capabilities of the prior art. First, the desired system must have color resolution over a wide area where the color may vary since the prints to be monitored are generally a very complex two-dimensional pattern, a part of which may be in color and the other part in black and white. Second, the system needs to be flexible and convenient to initialize since patterns are different with each press run. Finally, the desired system needs to be very fast since prints pass at rates of up to 20 copies per second.

SUMMARY OF THE INVENTION

The present invention solves the aforementioned problems with the prior art as well as others by providing a fiber optic apparatus and method for monitoring color balance. The present invention employs a light source and a plurality of separate optical fibers which are grouped into a plurality of fiber optic sensors positioned across the product. At least one optical fiber per sensor is connected to the light source for illuminating the product. At least two optical fibers per sensor are situated with illuminating fibers for receiving reflected light from the product. A filter connected to each of the receiving optical fibers separates the reflected light into different color components. A photodetector connected to each of the filters measures the different color component signals and converts these signals into analog electrical signals. A signal processor receives the analog signals and translates them into digital signals for characterizing the reflected light.

Advantageously, the present invention finds particular applicability to a printing machine having a printing roll. An additional feature provided by the present invention is a rotary encoder in communication with the signal processor for coordinating light measurements with location on the printing roll. A further advantage provides for mounting plates with a purge air supply means for keeping the fiber optic sensors clean for accurate characterization.

Accordingly, an object of the present invention is to provide a fiber optic apparatus and method for monitoring color balance on a product.

Another object of the present invention is to provide a monitor for a printing process which allows corrective action to be taken in a timely manner when color balance deviates from acceptable limits.

Still another object of the present invention is to provide a fiber optic color balance monitor which is capable of measuring color differences in complex two-dimensional patterns.

A further object of the present invention is to provide a fiber optic monitor which is flexible and convenient to initialize and can monitor prints at high rates.

Still a further object of the present invention is to provide a fiber optic color balance monitor which is simple in design, rugged in construction, and economical to manufacture.

The various features of novelty which characterize the present invention are pointed out with particularity in the claims annexed to and forming a part of this disclosure. For a better understanding of the invention, its operating advantages and specific objects attained by its use, reference is made to the accompanying drawings and descriptive matter in which the preferred embodiments of the invention are illustrated.

BRIEF DESCRIPTION OF THE DRAWINGS

In the drawings:

FIG. 2 is a cross-sectional illustration of a fiber optic sensor measurement point;

FIG. 3 is a sectional illustration thereof taken at III—III;

FIG. 4 is a schematic illustration of a four position fiber optic sensor detector assembly;

FIG. 5 is a sectional representation of a detector assembly located on a circuit board;

DESCRIPTION OF THE PREFERRED EMBODIMENTS

Figure 1:
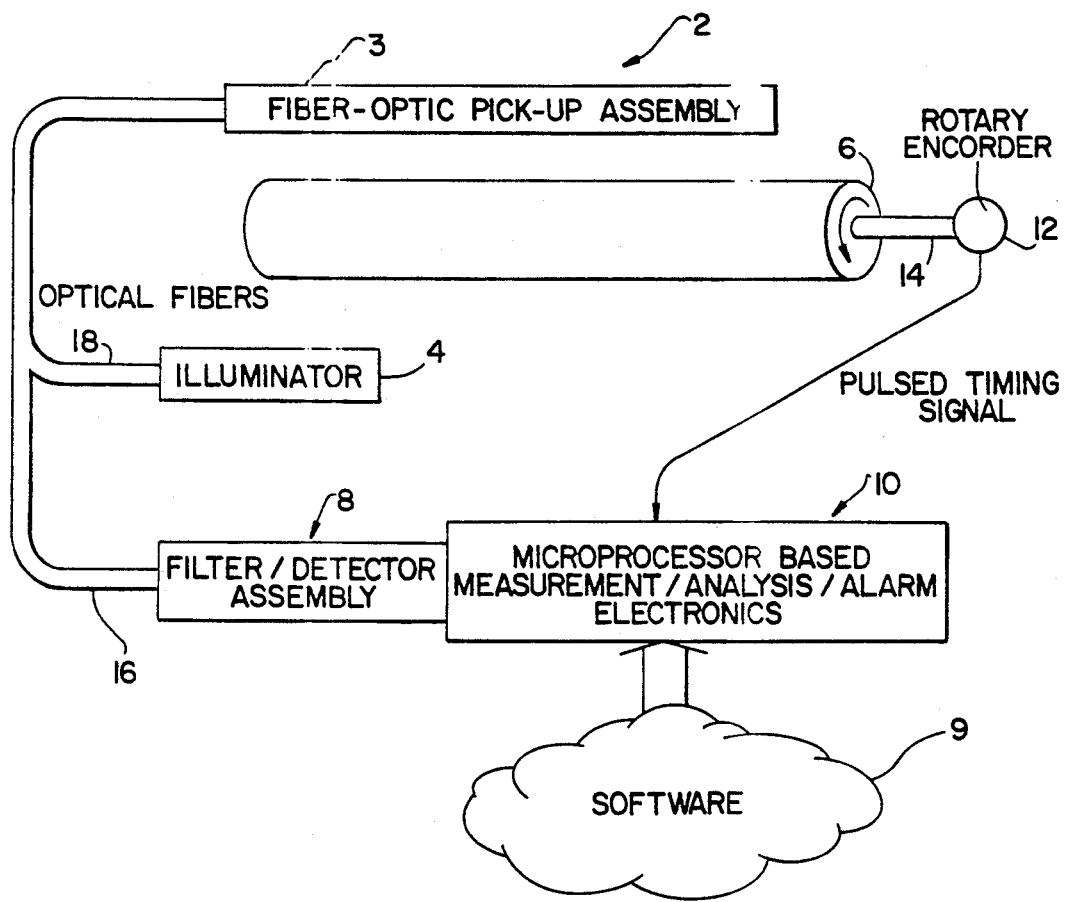
FIG. 1 is a schematic representation of the present invention.

Referring to FIG. 1, where like reference characters designate like or corresponding parts thoughout the several views, there is depicted a schematic representation of the present invention. A plurality of optical fiber sensors (2) are positioned in a fiber optic pick-up assembly (3) which extends across the width of a product (6) such as a printed page. A light source or illuminator (4), such as a multicolor laser or a well regulated high intensity lamp, transmits light through some of the optical fibers (18) for illuminating the printed page (6). Light is reflected from the page (6) and is received by other pick-up optical fibers (16) where it is delivered to a filter/detector assembly (8) which is an array of filters and detectors. A filter is associated with each of the receiving or pick-up optical fibers (16) to separate the reflected light into separate color components. Photodetectors in the detector assembly (8) convert the light intensity from each optical fiber into analog electrical signals which are then routed to a microprocessor based signal processing system (10) for conversion to digital output and subsequent analysis. The subsequent analysis indicates any change in color balance for actuating a visual and/or acoustic alarm.

A rotary encoder (12) mounted to a shaft (14) of the printing roll (6) generates pulses to allow the electronics in the signal processing system (10) to coordinate the several light measurements from fiber optic sensors (2) with their location on the print.

FIG. 2 illustrates the preferred arrangement of each fiber optic sensor (2) in the fiber optic pick-up assembly (3). In FIG. 2, a single fiber optic sensor generally designated (2) represents a single measurement point along the fiber optic pick-up assembly (3).

In the preferred embodiment for each measurement point, there are four pick-up or receiving optical fibers (16) and two illuminating optical fibers (18). While any optical fiber is suitable for the present invention, low cost, 0.5 millimeter diameter acrylic fibers are preferably used for both the illumination and the pick-up. The optical fibers (16, 18) are fastened into a mounting plate (20) by gluing or any other fastening means. Preferably, the illuminating fibers (18) are positioned on opposite sides of a cluster or group of the pick-up fibers as best seen in FIG. 3. In the preferred embodiment, the illuminating fibers (18) are recessed about two millimeters in the mounting plate (20) to minimize the amount of light which reaches the pick-up fibers (16) without the light having been reflected back from the print (6). All of the optical fibers (16, 18) view the print surface (26) directly, without lensing, to simplify the fabrication of the pick-up fiber optic sensor (2). Nonetheless, if lenses are desired, they may be employed. A cover plate (22) protects the ends of the optical fibers (16, 18) from dust or other interfering particles but still allows the light to pass tharethrough.

The optical fibers (16, 18) positioned in the fiber mounting plate (20) along with the cover plate (22) make up a single fiber optic sensor (2). Each of these fiber optic sensors (2) comprise a single measurement point in the fiber optic pick-up assembly (3).

The optical fibers (16, 18) view a target area (24) on the print surface (26) of the printing roll (6). Immediately above the print surface (26) are located upper and lower purge air plates (28, 30), respectively. Both purge air plates (28, 30) have apertures (32, 34) which are about one centimeter in diameter and in optical alignment with the optical fibers (16, 18). The apertures provide a with for both the measured light as well as purge air from a purge air supply (31). A relatively low flow of air is sufficient to keep the cover plate (22) clean. Additional plates (27, 29) may be employed to extend on either side of the vicinity of the target area (24), apertures (32, 34), the upper and lower purge air plates (28, 30), and up to the cover plate (22) for shading the target area from outside light sources such as room lights or sunlight. These optional additional plates (27, 29) are shown in FIG. 2. All of these features may be manufactured into a single fiber optic pick-up assembly (3).

Next, referring to FIG. 4, the four pick-up fibers (16) transmit the reflected light from the target area (24) of the print surface (26) to the filter/detector assembly (8).

FIG. 4 depicts four fiber optic sensors (2) located at four positions in the fiber optic pick-up assembly (3). Each fiber optic sensor (2) position has filters (36) labeled ($f_1$-$f_4$) and four detectors (38) labeled ($d_1$-$d_4$) The light from the four pick-up fibers (16) associated with a given measurement point or fiber optic sensor (2) position is essentially identical since all of the fibers view the same area. However, at the optical fiber termination point which is the filter/detector assembly (8), filters (36) ($f_1$-$f_4$) separate the reflected light into four distinct color components. These four separate color components are transmitted to detectors (38) ($d_1$-$d_4$) which correspond to the filters (36) ($f_1$-$f_4$) to characterize the light reflected from the printed surface (26). Typical color printing applications involve the use of four ink colors. To simplify the task of identifying which of the inks is experiencing a deviation from normal conditions, four color channels are chosen for each measurement point.

FIG. 5 illustrates an embodiment of the manner in which the optical fibers (16) terminate at the detectors (38). The optical fibers (16) are fastened into a fiber mounting board (40) by glue or other fastening means so that the fiber mounting board (40) communicates with a circuit board (42) holding the photodetectors (38) which may be silicon detectors. The detector area is large enough so that lensing is optional between the fiber (16) and the detector (38).

Figure 6:
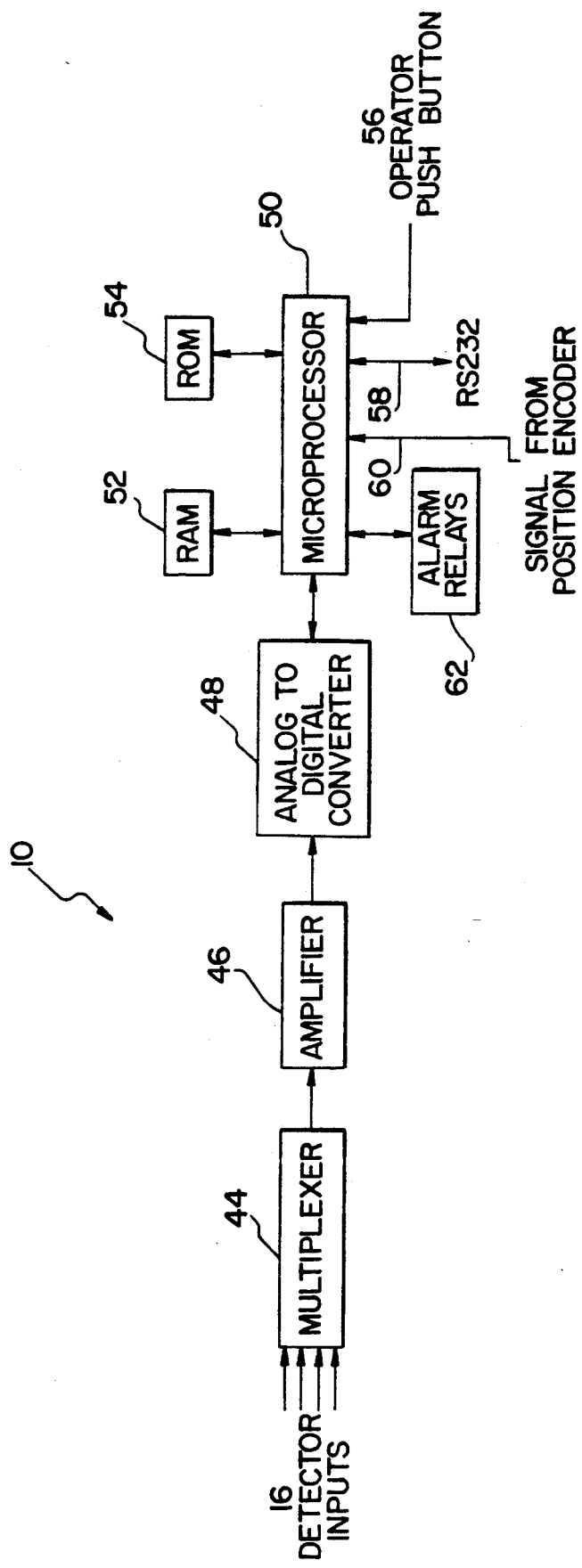
FIG. 6 is a block diagram of the components of a four position signal processing module.
Figure 7A:
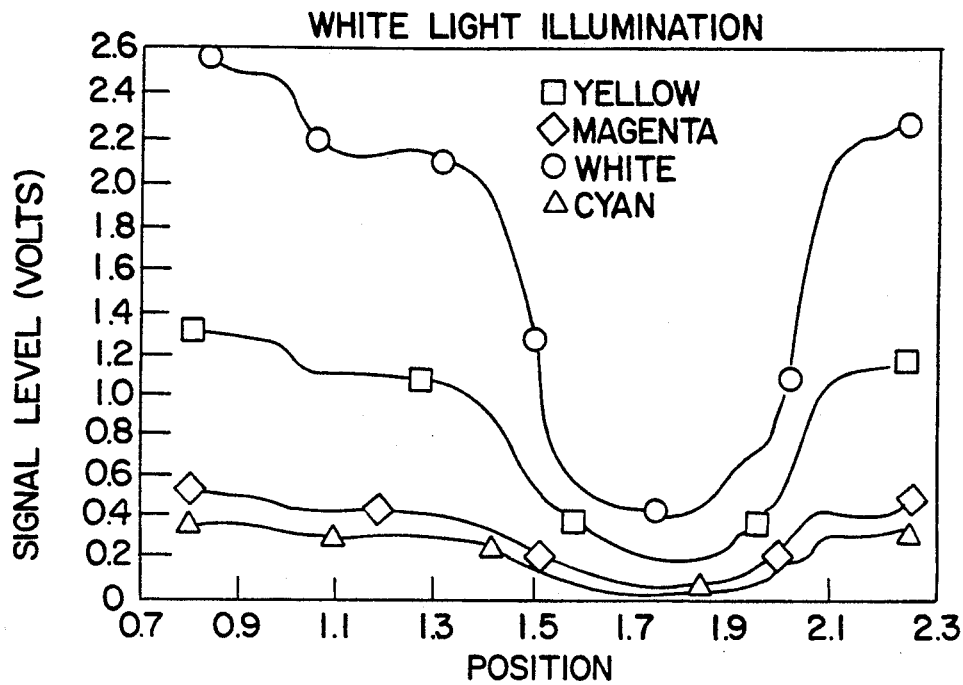
FIGS. 7(a-d) are four different lighting conditions of four differently filtered detector channels.
Figure 7B:
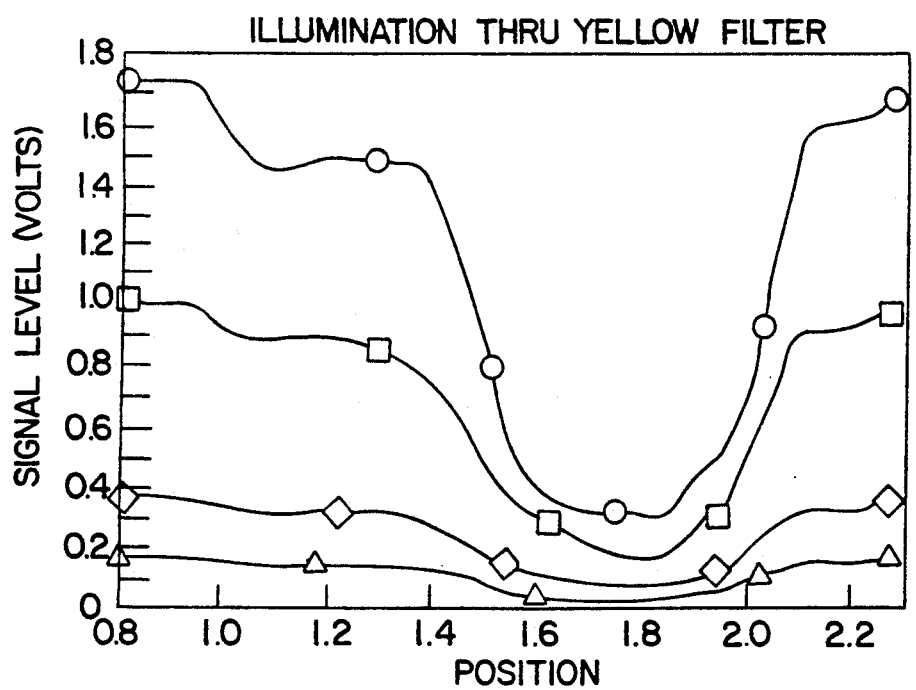
Figure 7C:
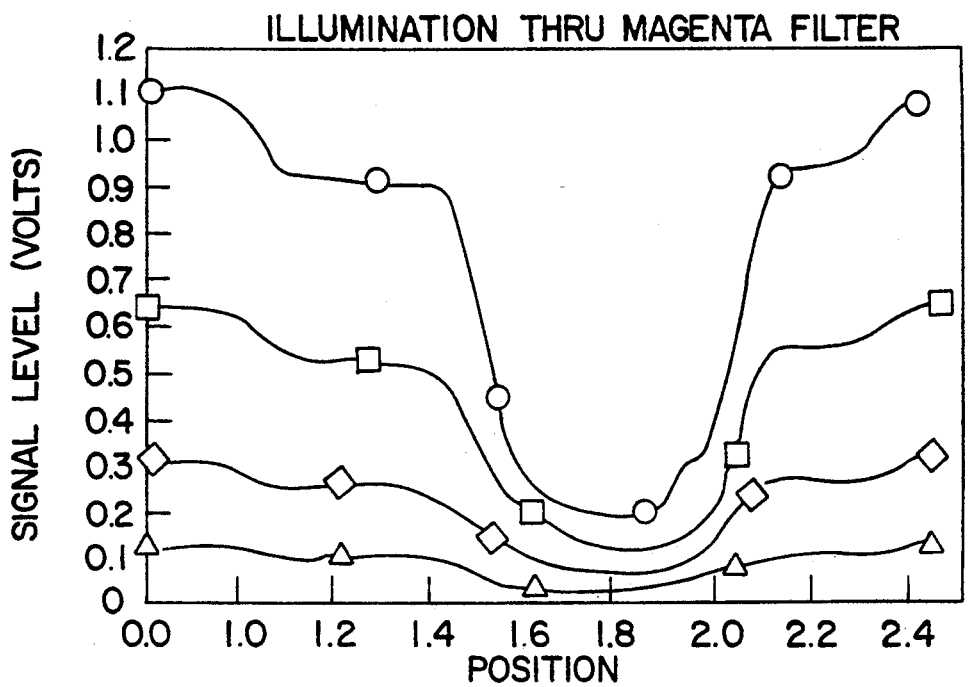
Figure 7D:
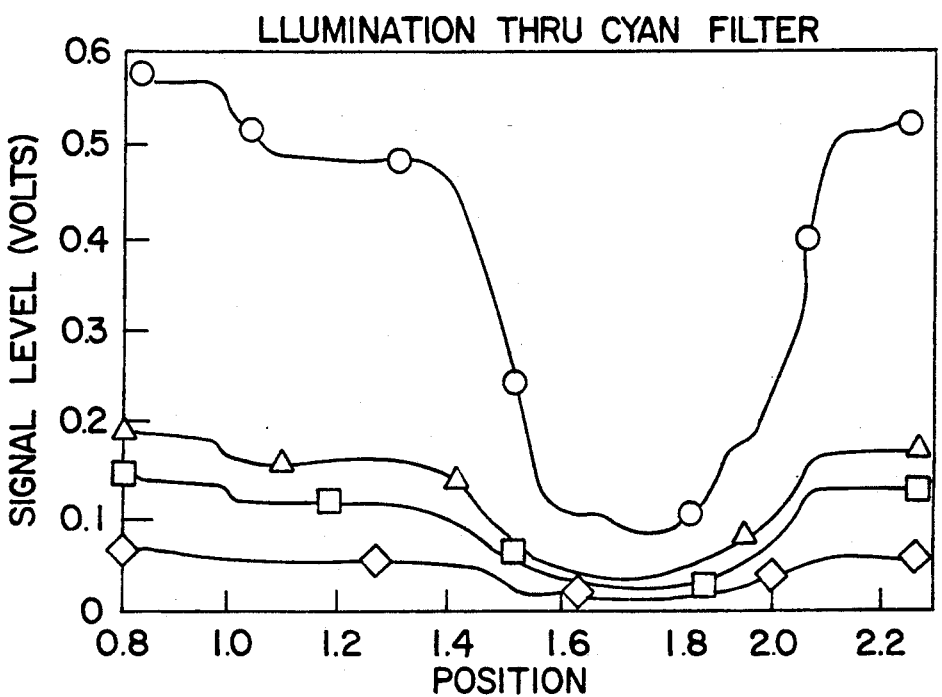

The major components of the signal processing module (10) are shown in FIG. 6. These components include a multiplexer (44), an amplifier (46), an analog to digital converter (48), and a microprocessor (50). The microprocessor (50) contains RAM (52) and ROM (54) with operator interface capability (56), such as a keyboard or some other means, with appropriate connections for an interface (58) such as a RS-232 and a connection (60) for the signal from the position encoder (12) and relays for visual and/or audio alarms (62).

Sixteen detector inputs are built onto a single circuit board (42) for holding sixteen detectors (38) as well as preamplifiers (64). This provides each signal processing module (10) with the ability to process measurements from four fiber optic sensor (2) positions. Additional measurement points are accommodated by simply adding more of the self-contained signal processing modules (10). Five signal processing modules (10) are required for an anticipated twenty point printing production system.

The sixteen detector output signals are multiplexed, amplified, and passed through an analog to digital converter to the microprocessor (50). Position encoder (12) pulses every 10 millimeters of print advance. Each pulse triggers the system (10) to scan the detectors (38) and store the resultant measurements in RAM (52). Sixty measurements are accumulated in memory from each detector (38) as a six hundred millimeter length of print passes under the pick up fibers (16). For sixteen channels (four measurement points), a print rate of 20 pages per second, and an average page length of 600 millimeters, each signal processing module (10) samples at 19,200 Hertz At the end of the scanned print, the system (10) switches to the analysis mode to determine whether the color balance is within desired limits. If an out-of-limits condition is detected, the appropriate alarm (62) is switched on. After the analysis is completed, the system (10) switches back to the measurement mode and scans another print. Because measurements are suspended during the analysis, the system (10) is capable of only checking every other passing print.

The signal processing module (10) is controlled with software (9) resident in the ROM (54). The signal processing module (10) includes an RS-232 standard serial communication port (58) which is optional for system operation, but which may be useful for communicating with programmable controllers or a desk-top computer. For example, the module (10) is programmed to transmit results of each analysis to another computer for storage as a record of press performance problems, or used as an input to a statistical process control (SPC) program to provide information for press maintenance scheduling.

The radiant power delivered by one of the pick-up fibers (16) to its associated detector (38) is expressed as follows:

$$P = P(\epsilon, f_i, \phi, y, m, c, B, I, w, l) \tag{1}$$

where, $\epsilon$ is the fraction of the total reflected light that falls onto the fiber (16), $f_i$ is the fraction of the light that is transmitted by the $i^{th}$ color filter (36) (i=1 to 4), $\phi$ is the diameter of the target area (24), y is the relative amount of yellow ink, m is the relative amount of magenta ink, c is the relative amount of cyan ink, B is the relative amount of black ink, I is the radiant power density incident on the surface of the print, and w,l are the width and length coordinates of the target area (24).

Measurements are taken at twenty different values of w but for any given detector (38) channel (w) is constant. On the other hand, the l coordinate changes with time as the print travels past the measurement point.

The factor $f_i$ is constant for any given fiber (16)/filter (36)/detector (38) set. Furthermore, $\epsilon$, $\phi$, and I is held constant so that, as successive prints pass under each measurement point, the four viewing detectors (38) ($d_1$-$d_4$) generate time varying signals which are repetitive for successive copies of the same print under nominal conditions.

These four detector signals at each measurement point are expressed as:

$$D_y = D_1(\underline{y}, m, c, B, t),$$

$$D_m = D_2(y, \underline{m}, c, B, t),$$

$$D_c = D_3(y, m, \underline{c}, B, t), \text{ and}$$

$$D_B = D_4(y, m, c, \underline{B}, t), \tag{2}$$

where dominant parameters are underlined.

These time dependent signals are different for each new print loaded into the press. However, as long as the same print is being copied, the time dependence of the signals remains the same. The variables y, m, c and B are the relative "ink-flow" factors that it is desired to monitor and the four measurements of Equation (2) are sufficient to determine the four ink-flow unknowns.

The minimum change in the variables, y, m, c, or B necessary to provide a detectable change in the detector output signals (system sensitivity) depends on how constant the factors $\epsilon$, f, I are held and on the inherent detector noise floor.

In practice, the press operator signals the signal processing module (10) via the operator interface (56) that the currently measured trace is to be used as the standard once he has satisfactorily tuned the color balance. Then, while in the analysis mode, the microprocessor (50) determines a deviation factor for each channel on its module. The deviation factor is defined as:

$$\delta(t) = D(t) - D_o(t), \tag{3}$$

where,

D(t) is the currently measured trace, and $D_o(t)$ is the standard trace for each color at each measurement location.

Several potential alarm criteria may be used. For each color at each measurement position along the print width, the deviation function, $\delta(t)\delta$, will consist of a series of sixty numbers, one for each of the sixty measurements spaced every ten millimeters along the print length. It is possible, and it may be desirable, to alarm if any of the sixty deviation values for a point exceeds a set limit. However, since expected problems are likely to effect more than just a single, isolated location, the sensitivity to variations in print color rendition is increased by summing several or all of the $\delta$ values for a given measurement position, over the length of the print.

In a simulation example, four plastic optical fibers were mounted together, five centimeters above a movable platform holding a page of colored newsprint. Each fiber delivered light to a separate silicon photodetector. One of the detectors received the light directly while the other three received light that was filtered. Yellow, magenta, and cyan filters were used. The signals from the four photodetectors were input to a computer based data acquisition system along with the signal from a sensor that monitored the position of the movable platform. Data was recorded simultaneously on all five channels as the platform was dragged to scan the newsprint past the optical-fiber pick-up. FIGS. 7(a-d) show the results of four such scans. In the first, the newsprint was illuminated directly by a lamp mounted beside the fiber pick-up. In each of the other scans, a colored filter was placed in front of the lamp to simulate a change of the color balance.

The FIGS. 7(a-d) data demonstrate that the changes in color balance induced by the filters are clearly detectable from the unfiltered, white light results. Although the general shape of the position response function from the same filtered signal from each fiber is about the same irrespective of the color of illumination, the output signal levels change significantly with illumination color. Using the white light data as the standard, the deviation in the detected signal levels for all three filtered channels is significant, indicating that the fiber optic color balance monitor detects changes in color balance.

Individual deviations from the four detector signals for each measurement point provide sufficient sensitivity for alarm signaling. An advantage of the microprocessor (50) electronics is their flexibility to accommodate a wide range of more complex analysis schemes.

Figure 8A:
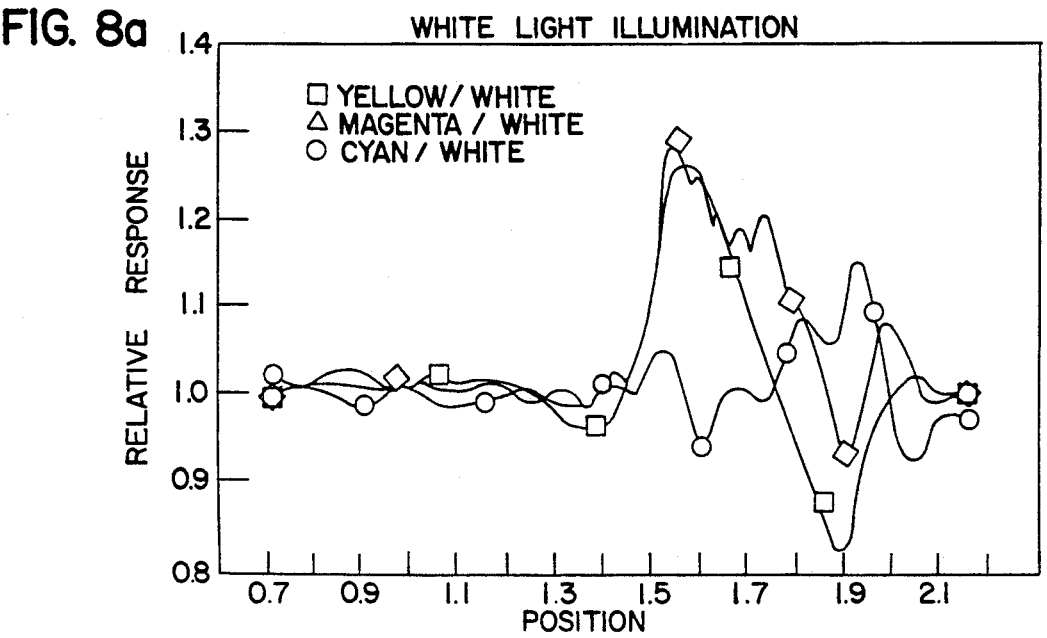
FIGS. 8(a-b) show the ratio of the three filtered channels to the unfiltered channel.
Figure 8B:
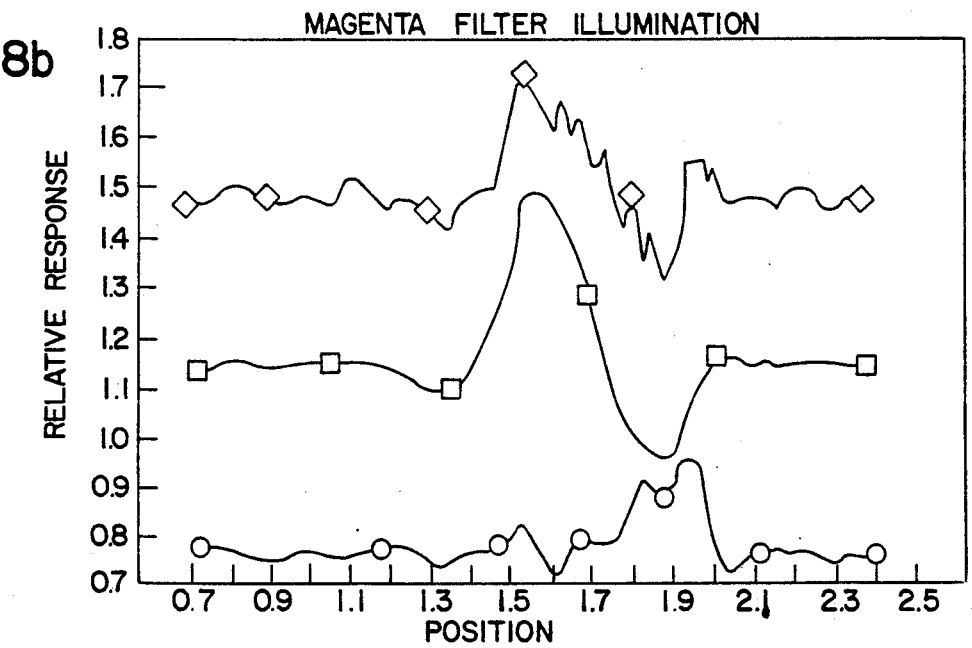
Figure 9A:
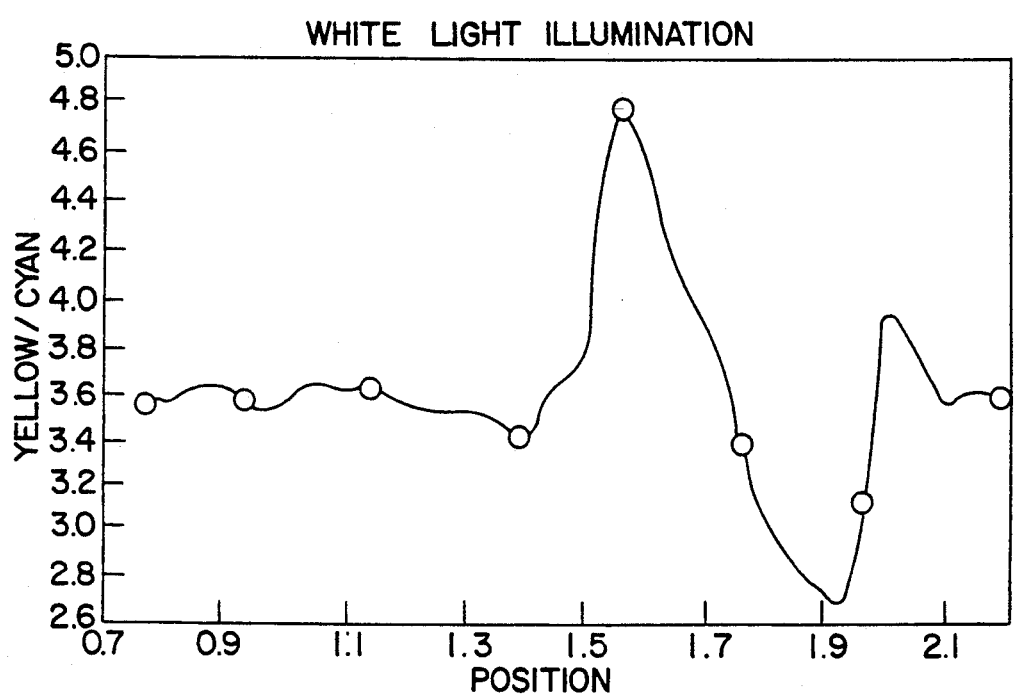
FIGS. 9(a-c) show the ratio of the yellow to cyan channel for white, yellow, and cyan illumination.
Figure 9B:
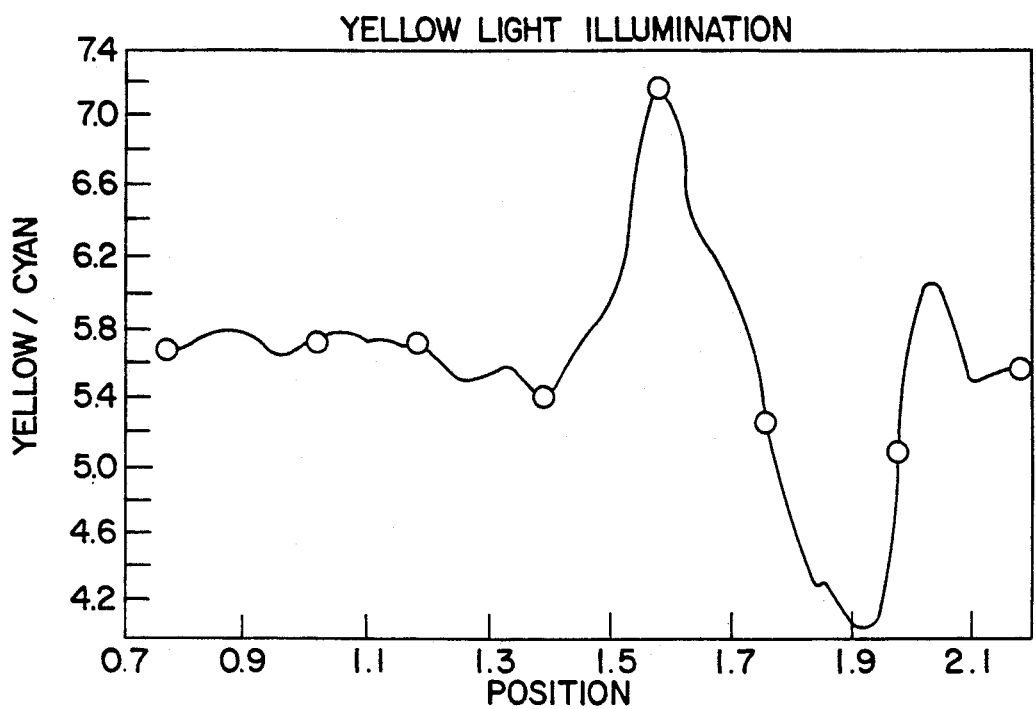
Figure 9C:
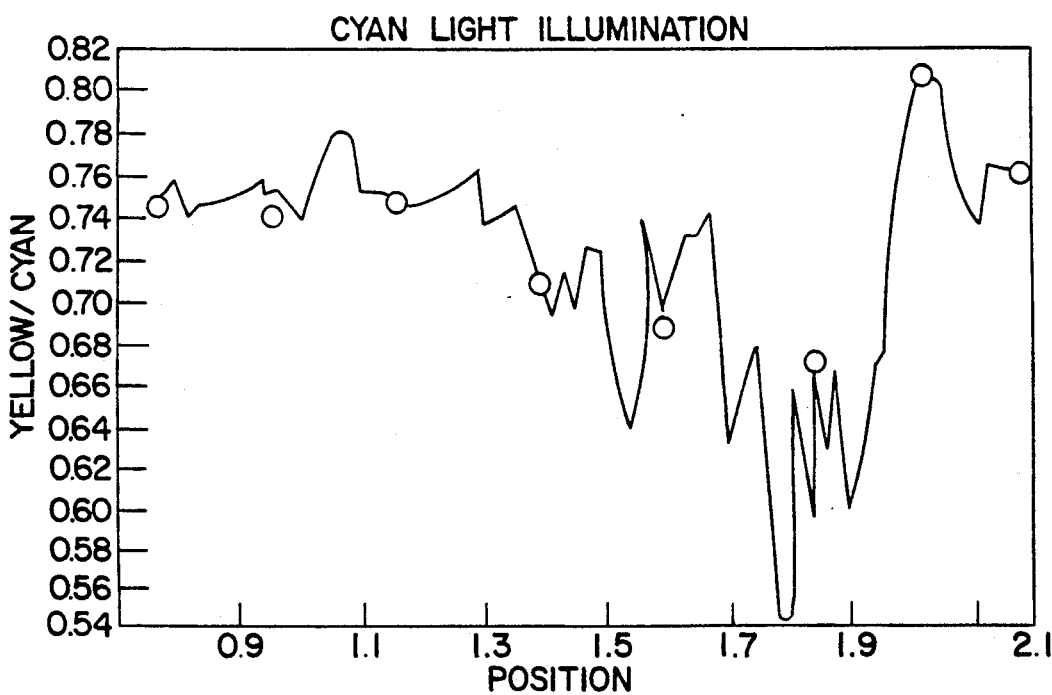

As an example, FIGS. 8(a-b) show the ratio of the three filtered channels to the unfiltered channel. The results are from the same test presented in FIGS. 7(a-d). Again, using the white light results as the standard, it is apparent in the ratios that the deviation caused by the magenta filtering of the light source is very large. In addition to the three ratio traces shown in FIGS. 8(a-b), three additional ratios are possible among the filtered channels FIGS. 9(a-c) show the ratio of the yellow to cyan channel for white, yellow, and cyan illumination. The signal level data used to generate the graphical plots of FIGS. 7(a-d), 8(a-b) and 9(a-c) are summarized in Tables 2 and 3.

While a specific embodiment of the present invention has been shown and described in detail to illustrate the application and principles of the invention, it will be understood that it is not intended that the present invention be limited thereto and that the invention may be embodied otherwise without departing from such principles.

TABLE 2

Detector Signal Maximum, Minimum, and Average Magnitudes for Different Lighting Conditions

|  | Y | M | W | C | Y/W | M/W | C/W | Y/M | C/M | Y/C |
|---|---|---|---|---|---|---|---|---|---|---|
| UNFILTERED LAMP | | | | | | | | | | |
| Maximum | 1.30 | 0.50 | 2.56 | 0.37 | 0.65 | 0.25 | 0.17 | 2.66 | 0.88 | 4.80 |
| Minimum | 0.19 | 0.09 | 0.41 | 0.06 | 0.42 | 0.18 | 0.13 | 2.11 | 0.55 | 2.68 |
| Average | 0.83 | 0.32 | 1.63 | 0.23 | 0.52 | 0.20 | 0.14 | 2.52 | 0.71 | 3.60 |
| LAMP THROUGH YELLOW FILTER | | | | | | | | | | |
| Maximum | 1.02 | 0.37 | 1.75 | 0.18 | 0.72 | 0.28 | 0.12 | 2.77 | 0.64 | 7.26 |
| Minimum | 0.16 | 0.07 | 0.30 | 0.03 | 0.47 | 0.19 | 0.10 | 2.14 | 0.37 | 4.06 |
| Average | 0.63 | 0.24 | 1.08 | 0.11 | 0.59 | 0.22 | 0.10 | 2.63 | 0.47 | 5.64 |
| LAMP THROUGH MAGENTA FILTER | | | | | | | | | | |
| Maximum | 0.63 | 0.31 | 1.10 | 0.12 | 0.76 | 0.36 | 0.14 | 2.18 | 0.51 | 7.24 |
| Minimum | 0.10 | 0.06 | 0.20 | 0.02 | 0.48 | 0.26 | 0.10 | 1.70 | 0.30 | 3.62 |
| Average | 0.41 | 0.20 | 0.70 | 0.08 | 0.59 | 0.30 | 0.11 | 1.98 | 0.38 | 5.30 |
| LAMP THROUGH CYAN FILTER | | | | | | | | | | |
| Maximum | 0.15 | 0.06 | 0.58 | 0.20 | 0.30 | 0.19 | 0.41 | 2.62 | 3.40 | 0.81 |
| Minimum | 0.02 | 0.01 | 0.09 | 0.04 | 0.21 | 0.10 | 0.33 | 1.37 | 2.06 | 0.55 |
| Average | 0.10 | 0.04 | 0.37 | 0.13 | 0.26 | 0.12 | 0.35 | 2.20 | 3.02 | 0.73 |

TABLE 3

Fractional Change in Detector Signals Caused by Filtering the Illuminating Lamp

|  | Y/Yo | M/Mo | W/Wo | C/Co | $\frac{(Y/W)}{(Y/W)o}$ | $\frac{(M/W)}{(M/W)o}$ | $\frac{(C/W)}{(C/W)o}$ | $\frac{(Y/M)}{(Y/M)o}$ | $\frac{(C/M)}{(C/M)o}$ | $\frac{(Y/C)}{(Y/C)o}$ |
|---|---|---|---|---|---|---|---|---|---|---|
| LAMP THROUGH YELLOW FILTER | | | | | | | | | | |
| Maximum | 0.78 | 0.75 | 0.68 | 0.49 | 1.11 | 1.12 | 0.76 | 1.04 | 0.72 | 1.51 |
| Minimum | 0.82 | 0.83 | 0.73 | 0.54 | 1.14 | 1.04 | 0.73 | 1.02 | 0.67 | 1.52 |
| Average | 0.76 | 0.73 | 0.67 | 0.48 | 1.14 | 1.09 | 0.73 | 1.04 | 0.67 | 1.57 |
| LAMP THROUGH MAGENTA FILTER | | | | | | | | | | |
| Maximum | 0.49 | 0.63 | 0.43 | 0.33 | 1.18 | 1.40 | 0.83 | 0.82 | 0.58 | 1.51 |
| Minimum | 0.54 | 0.67 | 0.49 | 0.38 | 1.14 | 1.43 | 0.76 | 0.81 | 0.55 | 1.35 |
| Average | 0.49 | 0.63 | 0.43 | 0.33 | 1.14 | 1.45 | 0.78 | 0.79 | 0.54 | 1.47 |
| LAMP THROUGH CYAN FILTER | | | | | | | | | | |
| Maximum | 0.11 | 0.13 | 0.23 | 0.54 | 0.47 | 0.74 | 2.51 | 0.98 | 3.87 | 0.17 |
| Minimum | 0.10 | 0.16 | 0.22 | 0.61 | 0.51 | 0.54 | 2.48 | 0.65 | 3.76 | 0.20 |
| Average | 0.12 | 0.13 | 0.23 | 0.56 | 0.50 | 0.59 | 2.47 | 0.87 | 4.28 | 0.20 |

We claim:

1. A fiber optic color balance monitor for continuously measuring color balance of a moving product having a width and a length, comprising:
   a light source;
   a fiber optic pick-up assembly positioned across the width of the product;
   a plurality fiber optic sensors positioned in said fiber optic pick-up assembly positioned across the product, each of said fiber optic sensors having two optical fibers connected to said light source for illuminating the product, and four optical fibers situated therebetween for receiving reflected light therefrom;
   a filter connected to each of said four optical fibers receiving reflected light for separating the reflected light into four distinct color components;
   a photodetector connected to each filter for receiving a different color component signal from each of said four optical fibers;
   a signal processor receiving said signals for characterizing the reflected light to determine color balance; and
   a rotary encoder in communication with said signal processor for coordinating light measurements with location on the product.

2. A fiber optical color balance monitor as recited in claim 1, wherein the product is an output of a printing machine having a printing roll.

3. A fiber optic color balance monitor as recited in claim 1, further comprising a mounting plate for said plurality of fiber optic sensors, said mounting plate extending across the product to be monitored.

4. A fiber optic color balance monitor as recited in claim 3, wherein said illuminating optical fibers are recessed in said mounting plate for minimizing light from being transmitted directly to said four optical fibers.

5. A fiber optic color balance monitor as recited in claim 4, wherein said illuminating optical fibers are recessed approximately two millimeters.

6. A fiber optic color balance monitor as recited in claim 3, further comprising at least one purge air plate positioned between said mounting pate and the product to be monitored, each of said purge air plates having a plurality of apertures with each of said apertures being in optical alignment with each of said fiber optic sensors, and means for supplying purge air to each of said purge air plates.

7. A fiber optic color balance monitor as recited in claim 1, wherein said signal processor is set to a predetermined color balance for tracking a repetitive pattern and identifying any deviations in that pattern.

8. A fiber optic color balance monitor as recited in claim 7, wherein said signal processor further includes an alarm to sound when deviations exceed preset limits.

9. A fiber optic method for continuously monitoring color balance of a moving product having a width and a length, comprising the steps of:
providing a light source;
positioning a plurality of fiber optic sensors in a fiber optic pick-up assembly across the width of the product, each of the fiber optic sensors having two optical fibers connected to said light source for illuminating the product, and four optical fibers situated therebetween for receiving reflected light therefrom;
separating the reflected light transmitted by the four optical fibers into four different color components;
detecting the four different color components and converting them to analog signals;
processing the analog signals into digital signals for characterizing the reflected light to determine color balance; and
coordinating light measurements with location on the product with a rotary encoder.

10. A fiber optic method as recited in claim 9, further comprising the step of purging air between the product and each of the plurality of fiber optic sensors.

* * * * *